J. McMurtry.
Car-Starter.

No. 74,927. Patented Feb. 25, 1868.

Witnesses
F. Lehmann
A. A. Yeatman

Inventor:
Jno. McMurtrie
Per
J. H. Alexander & Co
Attys

United States Patent Office.

JOHN McMURTRY, OF LEXINGTON, KENTUCKY.

*Letters Patent No. 74,927, dated February 25, 1868.*

---

IMPROVEMENT IN STARTING CARS.

---

The Schedule referred to in these Letters Patent and making part of the same.

---

TO ALL WHOM IT MAY CONCERN:

Be it known that I, JOHN McMURTRY, of Lexington, in the State of Kentucky, have invented certain new and useful Improvements in Methods for Starting Cars; and I hereby declare that the following is a true, full, and exact description of the same, reference being had to the accompanying drawings, and to the letters of reference marked thereon. In the drawings annexed, which make a part of this specification—

The letter A represents a spiral spring, $e$, that may be placed under the seat of the car, in the box $l$. A strong piece of timber, marked $o$, is extended from one end of the car to the other. The beam $c$ is flush with the bottom of the car, and has the toothed rack $b$ screwed to the bottom of it. Into the outer edge of beam $c$ the slots $d$ are cut, the object of which will be hereinafter explained. $ff$ designate the two friction-wheels attached to the common brake, $g\ g$. The wheels $ff$ operate on the same axles that operate the friction-wheels on the opposite side of the car. H H represent cog-wheels, keyed on the main axles, L L, inside of the driving-wheels I I. Resting against the inner surface of wheels H H are the disks J J, which fit loosely on the axles L. The said disks are furnished with pins or cogs $s$, which work in slots $d\ d$. $q$ is a double-faced pawl, pivoted to disk $j$ on its inner side, the said pawl being intended to operate on the cogs in wheels H H, in both directions alternately. On the shafts of wheels $f f$ are placed the pinions $n\ n$, which are intended to work in the toothed rack $b$. R R designate the common brake-cranks, for acting on brakes $g\ g$.

Figure 1:
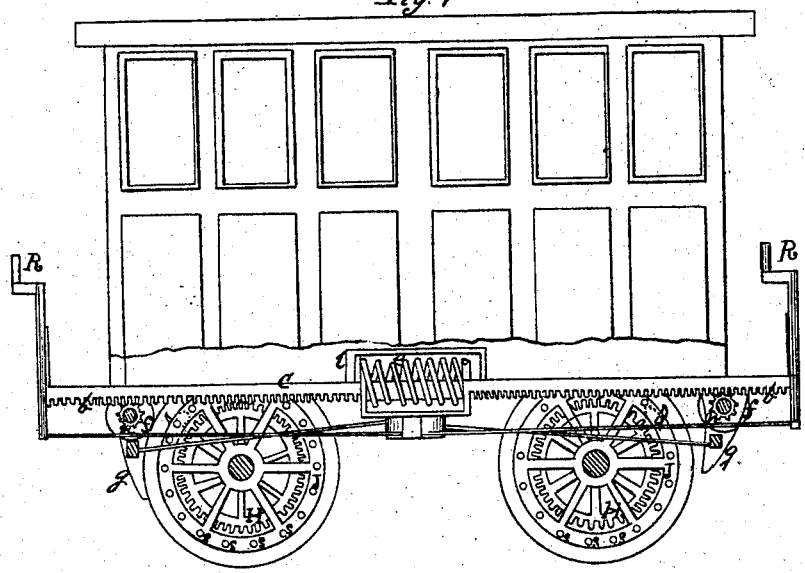
Figure 1 represents a side elevation of a car, with a part of the bottom removed, so as to exhibit my improvement.
Figure 2:
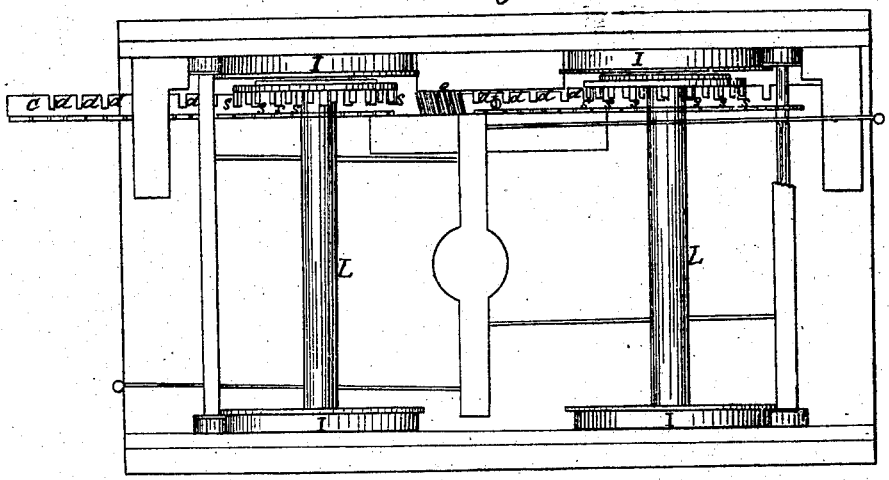
Figure 2 is a plan view of the car and works attached when inverted.
Figure 3:
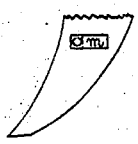
Figure 3 is a side view of brake $g$ and rubber spring.

The object of my improvement is to relieve the dead-point on the starting of the car, and the operation of the devices above described is as follows: In stopping of the cars, by the action of the brakes $g\ g$, the wheels $ff$ come in contact with the periphery of wheels I I, in advance of the brakes $g\ g$, but by means of an India-rubber spring, as shown, on the back of the shaft of the wheels $ff$, (see letter $m$, fig. 3,) the said shaft will yield, so as to let the brakes $g\ g$ press against the wheels I I, but the friction-wheels $ff$ will continue to turn until the car stops, and in turning operate the beam $c$ by the action of cog-wheels H on rack-bar $b$. The movement of beam $c$ will bring the pins $t$ in contact with spiral spring $e$, and force it back. This action will bring the pawl $q$ on the top of the fixed cog-wheel H. When it is desired to start the car, it is only necessary to let go the brake-handle R, when the spring $e$ will force back the beam $c$, whose slots $d$, working on the pins $s$ of the loose wheels $j$, will cause the pawls $q$ to move forward the car instantly. My improvement will operate alike from either end of the car.

Having thus described my invention, what I claim, and desire to secure by Letters Patent, is—

1. The beam $c$, when provided with slots $d\ d$, and rack $b$, operating substantially as and for the purpose set forth.

2. The disk J, provided with pins $s\ s$, in combination with beam $c$, substantially as described.

3. The spring $e$, in combination with pins $t$ and beam $c$, operating substantially as specified.

4. The cog-wheel H and double-acting pawl $q$, in combination with disk J, arranged substantially as and for the purpose described.

5. The friction-wheel $ff$, and pinions $n\ n$, in combination with beam $c$, operating substantially as set forth.

6. The brake $g$, provided with a slot and spring, $m$, in combination with friction wheels $ff$ and pinions $n\ n$, as and for the purpose specified.

In testimony that I acknowledge the foregoing as my own act, I hereby affix my signature in the presence of two witnesses.

JOHN McMURTRY.

Witnesses:
  GEO. C. McMURTRY,
  AD. I. KROESING.